United States Patent Office 3,804,826
Patented Apr. 16, 1974

3,804,826
THIOPYRIMIDINE DERIVATIVES
Karl-Heinz Scheit, Gottingen, and Peter Faerber, Hetjershausen bei Gottingen, Germany, assignors to Merck Patent Gesellschaft mit beschrankter Haftung, Darmstadt, Germany
No Drawing. Filed Aug. 20, 1971, Ser. No. 173,656
Claims priority, application Germany, Aug. 22, 1970, P 20 41 735.0
Int. Cl. C07d 51/50, 51/52
U.S. Cl. 260—211.5 R                              15 Claims

ABSTRACT OF THE DISCLOSURE

Compounds of the formula

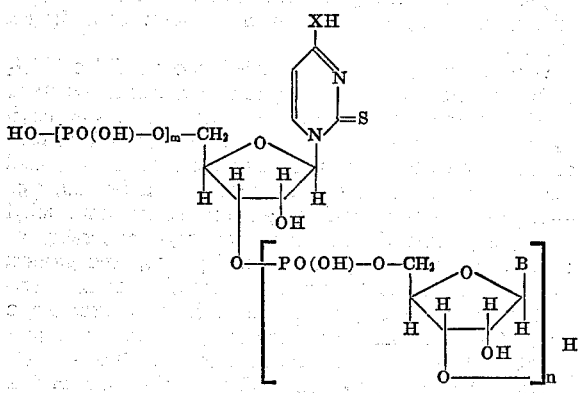

wherein B is a pyrimidine or purine group; X is S or NH; $m$ is an integer from 1 to 3, inclusive; and $n$ is an integer from 0 to 2,000, inclusive, with the provision that the sum of $m+n$ is at least 2; the metal and ammonium salts thereof; and the corresponding disulfides, possess interferon production stimulating activity which renders them useful in the prevention and treatment of viral infections.

BACKGROUND OF THE INVENTION

This invention relates to novel thiopyrimidines.

It is known that the production of interferon is involved in the body defenses against viral infection. Thus, a compound which stimulates the production of interferon can be useful as an anti-viral agent.

It is an object of this invention to provide novel antiviral agents, a process for their production and a method for the treatment and prevention of viral infections by the administration thereof. Other objects will be apparent to those skilled in the art to which this invention pertains.

SUMMARY OF THE INVENTION

The compounds of this invention are thiopyrimidines of the general Formula I

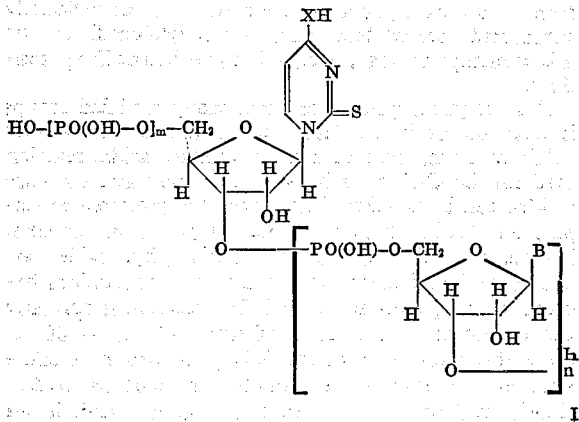

wherein B is a pyrimidine or purine group; X is S or NH; $m$ is an intger from 1 to 3, inclusive; and $n$ is an integer from 0 to 2,000, inclusive, with the provision that the sum of $m+n$ is at least 2; the metal and ammonium salts thereof; and the corresponding disulfides, i.e., compounds otherwise corresponding to Formula I wherein one or more pairs of —XH groups are replaced by —S—S— groups, including mixtures of any of the above.

In its process aspect, this invention relates to a process for the preparation of thiopyrimidines of Formula I which comprises (a) reacting 2,4-dithiouiridine monophosphate, 2-thiocytidine monophosphate of a compound of Formula I wherein $m=1$ with an inorganic or organic ortho- or pyrophosphate, respectively, one of the starting substances being present in activated form; (b) treating a compound otherwise corresponding to Formula I but wherein XH is replaced by groups which can be substituted by XH with a compound of the formula $H_2X$; (c) treating a compound otherwise corresponding to Formula I wherein at least one functional group thereof is present in a functionally modified form with a solvolyzing or reducing agent to liberate the functional group; and, optionally, one or more of the following steps of (d) treating a thus-obtained thiopyrimidine of Formula I with a polymerizing enzyme, optionally in the presence of a further nucleotide; (e) oxidizing a compound of Formula I with an oxidizing agent to produce a disulfide; and (f) converting the SH-group of a compound of Formula I, optionally in several stages into an $NH_2$-group by treatment with an ammonolyzing agent.

The compounds of this invention trigger the formation of interferon in living cells, both human and animal, in vitro as well as in vivo. Thus, the compounds of this invention are useful for protecting human and animal cells in vitro, and thus humans and animals, from virus infections and other intracellularly growing disease germs, e.g., those causing malaria, toxoplasmosis and trachoma. In addition to stimulating interferon induction, other mechanisms may beinvolved. For example, an increase in the body immunological defense mechanism, may also be involved.

DETAILED DISCUSSION

Of the compounds of Formula I, preferred are those of Formulae Ia through Id, which are compounds of Formula I, including the metal and ammonium salts thereof, wherein:

Ia: $m$ is 1 and $n$ is 1 to 2,000;
Ib: B is 2,4-dithiouracilyl, 2-thiocytosyl or adenylyl, especially those of Formula Ia;
Ic: B is a 2,4-dithiouracilyl and X is S, especially those of Formula Ia; and
Id: B is a 2-thiocytosyl and X is NH, especially those of Formula Ia.

The symbol B, which preferably is 2,4-dithiouracilyl or 2-thiocytosyl, can be any pyrimidine or purine group attached by the ring nitrogen atom in position 1 or 9, respectively. The pyrimidine and purine group can be unsubstituted or it can be substituted by one or more substituents, preferably those present on natural or synthetic nucleosides, e.g., halo, preferably chloro, bromo or fluoro, hydroxy, lower-alkyl, preferably methyl, primary, secondary or tertiary amino, e.g., $-NH_2$ $-NH$—lower-alkyl, $-N$(lower-alkyl)$_2$, $CF_3$, $-CHF_2$, $-CH_2NH_2$, $-CH_2N$(lower-alkyl)$_2$ e.g. $-CH_2N(CH_3)_2$ or $-CH_2N(C_2H_5)_2$, $-OCH_3$, $-SCH_3$, $-CH_2OH$.

Preferred pyrimidine and purine groups are those of a natural nucleoside, e.g., an adenine, guanine, cytosine, uracil, thymine, xanthine and hypoxanthine. Others include 5-fluorouracil, 5-methylcytosine and 5-hydroxymethylcytosine groups and the thio derivatives of each of the above, e.g., 2-thiouracil, 4-thiouracil, 2-thiothimine and 2,4-dithiothymine.

In the compounds of Formulae I, when $n$ is an integer greater than 1, each B group need not be identical in each glucophosphate group, e.g., in one or more of the polymer units, B can be 2,4-dithiouracilyl and in the remainder B can be, e.g., 2-thiocytosyl and/or adenylyl.

When $n$ is greater than 1, it can be, e.g., 2, 3, 4, 5, 6, 7, 8, 9, 10, 15, 20, 30, 40, 60, 80, 100, 200, 300, 400, 500, 1,000, 1,500 or 2,000, preferably 10 to 1000, more preferably 500 to 1800.

Preferred as salts of the compounds of Formula I are the physiologically acceptable salts, including the alkali metal salts, e.g., sodium and potassium, the alkaline earth metal salts, e.g., calcium and magnesium, the heavy metal salts, e.g., manganese, and the optionally substituted ammonium salts, including the alkyl, dialkyl and trialkylammonium salts, including the alkyl, dialkyl and trialkylammonium salts wherein alkyl contains 1–8, preferably 1–4 carbon atoms and salts of the corresponding amines wherein 1, 2, or 3 of the alkyl groups is substituted by a β- or γ-hydroxy group, e.g., triethyl-, monoethanol-, diethanol-, triethanol- and tri-n-butylammonium salts. Other salts can be employed for isolation, purification and characterization purposes.

Specific examples of compounds of this invention are the following in free acid and sodium salts thereof:

2,4-dithiouridine-5′-diphosphate,
2,4-dithiouridine-5′-triphosphate,
2-thiocytidine-5′-diphosphate,
2-thiocytidine-5′-triphosphate,
poly-2,4-dithiouridine-5′-phosphate,
poly-2,4-dithiouridine-5′-diphosphate,
poly-2,4-dithiouridine-5′-triphosphate,
poly-2-thiocytine-5′-phosphate,
poly-2-thiocytidine-5′-diphosphate,
poly-2-thiocytidine-5′-triphosphate,
polyriboadenylyl-2,4-dithiouridylic acid,
polyriboadenylyl-2-thiocytidylic acid,
polyribo-guanylyl-2,4-dithiouridlic acid,
polyribo-cytidylyl-2,4-dithiouridylic acid,
polyribo-uridylyl-2,4-dithiouridylic acid,
polyribo-5-fluorouridylyl-2,4-dithiouridylic acid,
polyribo-5-hydroxymethylcytidylyl-2,4-dithiouridylic acid,
polyriboguanylyl-2-thiocytidylic acid,
polyribo-cytidylyl-2-thiocytidylic acid,
polyribo-uridylyl-2-thiocytidylic acid,
polyribo-5-fluorouridylyl-2-thiocytidylic acid,
polyribo-5-hydroxymethylcytidylyl-2-thiocytidylic acid,
polyriboinosylyl-2,4-dithiouridylic acid, and
polyribo-inosylyl-2-thiocytidylic acid.

The monophosphates of 2,4-dithiouridine or of 2-thiocytidine (I, $m=1$, $n=0$) are known. The reaction of these compounds or the reaction of a compound of Formula I wherein $m=1$ with an ortho- or pyrophosphate, for example, with an alkalimetal phosphate or pyrophosphate, e.g. sodium phosphate or pyrophosphate, or a trialkylammonium phosphate or pyrophosphate, produces the corresponding di- or triphosphate, respectively (I, $m=2$ or 3, respectively). One of the starting materials has to be present in an activated form, for example, as the imidazolidate (obtainable by reaction with carbonyl diimidazole, e.g., in dimethylformamide (DMF) at a temperature of from 0 to 50° C., suitably 20 to 40° C.), the morpholidate (obtainable by reaction with morpholine and a condensation agent, e.g., dicyclohexyl carbodiimide (DCC) or an arylsulfonyl chloride), the anilide (obtainable by reaction with aniline and a condensation agent, e.g., DCC or an arylsulfonyl chloride), or as an activated ester, for example, the p-nitrophenyl ester (obtainable by reaction with p-nitrophenol and a condensation agent, such as DCC or an arylsulfonyl chloride) or as the 2-pyridyl ester (obtainable by reaction with 2-hydroxypyridine and a condensation agent, or by reaction with bis(2-pyridyl) carbonate). The reaction is suitably carried out in an inert solvent, e.g., dimethylformamide (DMF), dimethyl sulfoxide (DMSO), pyridine, acetonitrile or tert.-butanol at a temperature of from 10 to 100° C., suitably room temperature. The reaction times normally range between 1 and 48 hours. The working up operation must be conducted in a gentle fashion in order to avoid yield reductions due to solvolytic decompositions. Therefore, chromatographic methods are generally utilized, e.g., on diethylaminoethylcellulose (DEAE-cellulose). If desired, the thus-obtained products can be converted into the metal or ammonium salts thereof by reaction with a base or a salt, e.g., sodium perchlorate in acetone.

A compound otherwise corresponding to Formula I wherein a group replaceable by the XH group is present in place of this latter group, is converted into a compound of Formula I by treatment with ammonia or hydrogen sulfide.

Groups which can be converted into an SH or $NH_2$ group are those which exhibit, in a nucleophilic reaction, good "leaving group" properties, including lower-alkylmercapto, e.g., methyl-, ethyl-, n-propyl- and others containing 1–4 carbon atoms, benzylmercapto; sulfonic acid residues and the salts thereof, such as alkali-metal, e.g., $—SO_3Na$; sulfonic acid alkyl, preferably lower-alkyl (1–4), e.g., methyl and ethyl, and aryl, preferably of 6–10 carbon atoms, e.g., phenyl and p-tolyl, ester groups; halo, e.g., chloro or bromo. In the reaction, an inert solvent is advantageously employed, such as for example, a lower (1–4) alcohol, e.g., methanol, ethanol or isopropanol, preferably at a temperature of from 0 to 40° C., suitably at room temperature. The reaction with $H_2S$ is advantageously conducted in the presence of a basic, preferably an amine or quaternary ammonium hydroxide, catalyst, e.g. triethylamine, tri-n-butylamine and tetraethylammonium hydroxide.

Compounds of Formula I are also produced by liberating, in a compound otherwise corresponding to Formula I but wherein at least one functional group thereof, e.g., OH, SH, or $NH_2$, is present in the functionally modified form, e.g., as an ester, ether, acetal, orthoester, thioester, amide, the corresponding functional group by treatment with a solvolyzing, preferably a hydrolyzing agent. Examples of functionally modified OH-groups are acyloxy, preferably containing up to 8 carbon atoms, and more preferably lower-alkanoyloxy, such as formyloxy, acetoxy, propionyloxy, butyryloxy, isobutyryloxy, aroyloxy, including benzoyloxy, readily cleavable ether groups, including benzyloxy and triphenylmethoxy. Examples of suitable functionally modified SH-groups are acylmercapto, preferably containing up to 8 carbon atoms, such as formyl-, acetyl-, propionyl-, butyryl-, isobutyryl and benzoylmercapto. Examples of suitable functionally modified $NH_2$-groups are acylamido, preferably containing up to 8 carbon atoms, e.g., acetamido, propionamido and benzamido. Adjacent OH-groups can be functionally modified in the form of an acetal, ketal or orthoester, e.g., as optionally substituted benzylidenedioxy, isopropylidenedioxy, or alkoxymethylenedioxy, e.g., ethoxymethylenedioxy residues.

A solvolytical splitting of functionally modified groups is advantageously conducted in an alkaline or weakly acidic medium, since in a more strongly acidic reaction medium the C-N bond between the sugar and the base residue can be attacked. Therefore, it is preferred to employ an alkali metal, e.g., sodium or potassium, or alkaline earth metal, e.g., calcium or barium, hydroxide, carbonate or bicarbonate, or a quaternary ammonium hydroxide, or aqueous acetic acid. The reaction is normally carried out at a temperature of from −10 to +100 C., preferably room temperature. Solvolysis with more dilute stronger acid such as very dilute, e.g., 0.01 M, hydrochloric acid or 1% strength trifluoroacetic acid, in an inert solvent at low temperatures, e.g., −10 to +10° C., preferably 0° C., is likewise possible. The solvolysis is normally conducted in an aqueous medium. If desired, one or more inert organic solvents can be added to the aqueous solution. Examples of such solvents are the alcohols, preferably the lower-alkanols, e.g., methanol, ethanol and isopropanol, ketones, preferably the di-lower-alkanones, e.g., acetone and butanone, amines, preferably the tertiary amines, e.g., pyridine and triethylamine, the liquid amides, e.g., DMF and sulfoxides, e.g. DMSO.

Reducible, functionally modified groups, e.g., benzyloxy, triphenylmethoxy, nitro and azido groups, can also be converted into free —OH and —NH$_2$ groups by treatment with reducing agents. Thus, for example, nitro and azido groups can be reduced to amino groups with zinc dust in aqueous, preferably 80%, acetic acid, at temperatures, e.g., from 0 to 40° C., preferably 15 to 30° C.

The thiopyrimidine derivatives obtained in accordance with this invention, especially the mononucleotides of Formula I wherein I, $m=2$ or 3 and $n=0$, optionally can be polymerized, e.g., with polymerizing enzymes. In the usual case, if no additional nucleotide is added, oligo- or polynucleotides of Formula I wherein $n>1$ are thus-produced containing identical B groups, e.g., 2,4-dithiouracilyl (Formula Ic) or 2-thiocytosyl (Formula Id).

If a further nucleotide is added to the polymerization reaction, e.g., adenosine di- or triphosphate, uridine di- or triphosphate, cytidine di- or triphosphate, guanosine di- or triphosphate, inosine di- or triphosphate, thymidine di- or triphosphate, xanthosine di- or triphosphate, the additional nucleotide can be incorporated into the thus-produced polynucleotide. In this case, oligo- or polynucleotides I are produced wherein different B groups are present in the same molecule, e.g., 2,4-dithiouracilyl and adenylyl.

Suitable enzymes for the enzymatic synthesis of such polynucleotides, especially for the polymerization of the mononucleotides I ($m=2$, $n=0$), are the polynucleotide phosphorylases E.C.2.7.7.8 (obtainable for example, from *Escherichia coli*).

If the enzymatic polymerization of the mononucleotides I ($m=2$ or 3, $n=0$) takes place by matrix-dependent polymerases, the composition and sequence of the polynucleotides is determined by those of the matrix. For example, using polydesoxy ribo-adenylyl thymidine as the matrix, oligo- or polynucleotides I are obtained wherein, in the same molecule, in an alternating sequence, B=2,4-dithiouracilyl and B=adenylyl. Suitable enymes for the synthesis of such polynucleotides are the RNA polymerases E.C.2.7.7.6 (for example from *Escherichia coli*), especially for the polymerization of the mononucleotides I ($m=3$, $n=0$).

The enzymes can also be utilized in the polymerization in the form of crude extracts or in purified form. In order to avoid the formation of disulfide during the polymerization, it is advantageous to add an inhibitor, e.g., dithiothreitol or dithioerythritol (threo- or erythro-2,3-dihydroxybutane-1,4-dithiol; "Cleland's reagent") or 2-mercaptoethanol. The polymerization is ordinarily carried out in an aqueous medium at a pH of between about 5.5 and 9.5, preferably between 8 and 9, at a temperature of between 0 and 80° C., preferably between 20 and 45° C., especially at about 37° C. Buffer substances are advantageously added, for example, tris(hydroxymethyl)-aminomethane ("tris"), ammonium carbonate, or sodium cacodylate. It is also advantageous to add an inorganic salt during the polymerization, for example, magnesium chloride, manganese (II) chloride or calcium chloride. The polymerization is normally terminated after about 1–72 hours.

The thus-obtained polymers can form multiple strands, e.g., double strands (double helices). For example, poly-2,4-dithiouridylic acid (I, X=S; B=2,4-dithiouracilyl, $n$=about 1000) forms with itself a stable double helix.

Mono-, oligo- and polynucleotides of Formula I (X=S) can be oxidized with oxidizing agents, e.g., iodine (preferably in aqueous phosphate buffer solutions at pH values of between 5 and 9, especially around 7–7.5, and at temperatures of between about −10 and +40° C., particularly between about 0 and 10° C.) to form the corresponding disulfides. In the case of the oligo- and polynucleotides, the oxidation can be conducted in such a manner that not all of the SH-groups present in the molecule are oxidized, but rather only several of these groups. The formation of —S—S-bridges within a double strand possibly exerts a stabilizing effect, e.g., against nucleases.

An SH-group present in a compound of Formula I can be converted into an NH$_2$-group, for example, by treating a trialkylammonium salt of a compound of Formula I (X=S) with gaseous ammonia in a solvent, e.g., an alcohol, DMF or DMSO, at an elevated temperature, e.g., about 50–100° C., or more advantageously by a multi-stage ammonolysis wherein a thiol compound of Formula I (X=S) is first converted by reaction with air or oxygen in the presence of sodium sulfite/sodium bisulfite in an aqueous solution, preferably at a pH of about 7, at a temperature of between about 0 and 40° C., preferably room temperature, and a reaction time of about 0.5–8 hours, into the corresponding sulfonate, i.e., a compound otherwise corresponding to Formula I, but having SO$_3$Na group in place of the XH group. By treating this sulfonate with an ammonium salt, for example, NH$_4$Cl, e.g., in an aqueous solution at a pH of between about 7 and 10, preferably about 8.5, and at temperatures of between about 0 and 40° C., preferably room temperature, the corresponding amino compound of Formula I (X=NH) are obtained.

The compounds of Formulae I and II can be employed as drugs in the human and veterinary medicine and as intermediates for the manufacture of other drugs, for example, by converting polynucleotides of Formula I by desulfuration into known polynucleotides which themselves exhibit an interferon-stimulating effect. Further, those polynucleotides of Formula I which do not hybridize with themselves can be hybridized with other, for example conventional, polynucleotides.

The novel compounds of this invention can be employed in a mixture with solid, liquid and/or semiliquid excipients as drugs in the human or veterinary medicine. Suitable carriers are those organic or inorganic substances adapted for parenteral, enteral, or topical application and which do not react with the novel compounds, such as, for example, water, vegetable oils, benzyl alcohols, polyethylene glycols, gelatin, lactose, amylose, magnesium stearate, talc, vaseline, cholesterol. Especially suitable for parenteral application are solutions, preferably oily or aqueous solutions, as well as suspensions, emulsions or implants. Amenable to enteral application are tablets, dragees, capsules, syrups, elixirs or suppositories, and for topical application salves, creams or powders. The above-described pharmaceutical compositions can optionally be sterilized or mixed with auxiliary substances, such as lubricants, preservatives, stabilizers, or wetting agents, emulsifiers, salts for influencing the osmotic pressure, buffers, coloring, flavoring and/or aromatous substances. Preferred are both the intravenous or subcutaneous application by injection and the intranasal or intra-oral application, preferably by the aid of an aerosol preparation, using conventional propellants, e.g. fluorochlorohydrocarbons.

The substances are preferably administered in a dosage of 0.1–100 mg. per dosage unit.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the examples set forth below, the temperatures are indicated in degres Celsius. "Phosphate analysis" means the ratio of nucleoside:phosphate, determined according to Can. J. Biochem. Physiol., vol. 41, p. 469 (1963). The $S_{20,w}$-values are obtained by sedimentation velocity analysis by means of an analytical ultracentrifuge.

EXAMPLE 1

(a) 1 mmol of bis(triethylammonium)-2,4-dithiouridine-5'-phosphate in 10 ml. of DMF is reacted with 2 mmol of carbonyl diimidazole at temperatures of between 20 and 40° to form the imidazolidate. After 20 minutes, 5 mmol of tris(tri-n-butylammonium) phosphate in 5 ml. of DMSO is added thereto and the reaction mixture allowed to stand overnight. The solvents are partially removed under reduced pressure, and the residue is mixed with 800 ml. of water. The aqueous solution is introduced into a DEAE-cellulose column (50 x 2.5 cm.), eluted with a linear gradient on triethylammonium bicarbonate, 0–0.5 M, the fractions are combined which contain the 2,4-dithiouridine-5'-diphosphate, and the mixture is evaporated to dryness at 15° under reduced pressure. The residue is taken up in a small amount of methanol, 2 equivalents of sodium perchlorate in a small quantity of acetone are added thereto, and the product is precipitated by the addition of acetone. After centrifuging and repeated washing with acetone, the thus-obtained amorphous disodium salt of 2,4-dithiouridine-5'-diphosphate is dried at 15 torr. UV spectrum (in water, pH 5.5): $\lambda_{max.}$ 280 and 340 nm. Phosphate analysis 1:2.2.

By using bis(triethylammonium) - 2 - thiocytidine-5'-phosphate as the starting compound, the disodium salt of 2-thiocytidine-5'-diphosphate is analogously obtained. UV spectrum (in water, pH 7.0): $\lambda_{max.}$ 247, wing at 272 nm., $A_{247}/A_{272}$=1.23. Phosphate analysis: 1:1.90.

Analogously, with the use of tetrakis(tri-n-butylammonium) pyrophosphate, the trisodium salt of 2,4-dithiouridine-5'-triphosphate is produced (UV spectrum in water, pH 5.5: $\lambda_{max.}$ 280 and 340 nm.; $A_{280}/A_{340}$=1.85; phosphate analysis 1:2.90) or the trisodium salt of 2-thiocytidine-5'-triphosphate is thereby obtained (UV spectrum in water, pH 7.0: $\lambda_{max.}$ 247, wing at 272 nm.; $A_{247}/A_{272}$=1.30; phosphate analysis 1:2.95).

(b) 4 ml. of an aqueous mixture (pH 8.3) containing 0.4 mmol of tris·HCl buffer, 0.008 mmol of $MgCl_2$, 0.04 mmol of the disodium salt of 2,4-dithiouridine-5'-diphosphate, 0.04 mmol dithiothreitol, and 10 enzyme units of polynucleotide phosphorylase (specific activity 0.165 mmol UDP/hour × mg. protein at 37°) is incubated for 4 hours at 37°. The protein is thereafter removed by repeated extraction with chloroform-isoamyl alcohol (25:2 parts by volume). The aqueous phase is concentrated at 15° to a volume of about 1.5 ml. and dialyzed in a dialysis chamber for 48 hours at 3° against 0.01 M tris·HCl (pH 7.0). The buffer is changed 4 times. The product thus obtained is poly-2,4-dithiouridine-5'-phosphate (poly-2,4-dithiouridylic acid, poly s.$^2$s.$^4$U). $S_{20,w}$-value: 12 S. UV spectrum (in water, pH 7): $\lambda_{max.}$ 270 nm. ($\epsilon_p$=3500); $A_{280}/A_{340}$=5.4; pK-value: 9.2 (determined by spectrophotometric titration). In the UV spectrum in 0.05 M sodium cacodylate (pH 7.0), a helix coil transition is shown with a $T_m$-value of 81°.

Analogously, from the disodium salt of 2-thiocytidine-5'-diphosphate, the poly-2-thiocytidine-5'-phosphate is obtained (poly-2-thiocytidylic acid, poly s.$^2$C). $S_{20,w}$-value: 5 S. UV spectrum (water, pH 7.0): $\lambda_{max.}$ 244, wing at 270 nm.; $A_{244}/A_{270}$=1.25.

(c) 2.5 ml. of an incubation mixture containing 0.003 mmol of adenosine triphosphate, 0.003 mmol of the trisodium salt of 2,4-dithiouridine - 5' - triphosphate, 0.003 mmol dithiothreitol, 0.075 mmol of $MgCl_2$, 0.6 $A_{260}$ units (about 0.0001 mmol) of polydesoxyribo-adenylyl thymidine, and 360 enzyme units of RNA polymerase (defined in accordance with "Procedures in Nucleic Acid Research," by G. L. Cantoni and D. R. Davies, ed., Harper and Row, New York and London, 1966, vol. I, p. 323) is incubated at 37° for 6 hours, then diluted with 0.7 ml. of 4% strength sodium dodecyl sulfate solution, and the protein is removed by repeated extraction with chloroform-isoamyl alcohol (5:2). The aqueous phase is concentrated at 15° to about 1 ml. and dialyzed in a dialysis chamber for 48 hours at 3° against a 0.01 M tris. HCl buffer solution (pH 7.0). Thereafter, the chamber contains polyribo - adenylyl - 2,4 - dithiouridylic acid [poly r.(A-s.$^2$s.$^4$U)]. $S_{20,w}$-value: 12 S. UV spectrum (in water, pH 7.0): $\lambda_{max.}$ 280 and 340 nm., $A_{280}/A_{340}$=1.90. In the UV spectrum, no thermal transition from the helix into the coil form can be detected between 0 and 100. The polynucleotide is therefore probably present in the coil shape.

(d) 0.001 mmol (21 $A_{270}$ units) of poly s.$^2$s.$^4$U in 1 ml. of 0.1 M phosphate buffer (pH 7.4) is mixed at 3° with 0.001 mmol $I_2$ (0.01 ml. of a 0.1 N aqueous $I_2$ solution). After 2 hours at 3°, the reaction solution is dialyzed in a dialysis chamber for 15 hours at 3° against 0.05 M tris·HCl (pH 7.0). The disulfied of poly s.$^2$s.$^4$U is thus produced. $S_{20,w}$-value: 17 S. UV spectrum (in water, pH 5.5): $\lambda_{max.}$ 288 nm. ($\epsilon_p$=30,000) and 340 nm. ($\epsilon_p$=2800).

Analogously, the corresponding disulfide is obtained from poly r.(A-s.$^2$s.$^4$U). $S_{20,w}$-value: 16 S. UV spectrum (in water, pH 5.5): $\lambda_{max.}$ 288 nm. ($\epsilon_p$=15,000) and 340 nm. ($\epsilon_p$=1400).

(e) 0.02 ml. of a 3:1 (parts by volume) mixture of 1 M $Na_2SO_3$ solution and 1 M $NaHSO_3$ solution is added to 2 ml. of an aqueous solution of 5 mmol of the disodium salt of 2,4-dithiouridine - 5' - diphosphate. Air is sucked through the reaction solution and, at intervals of respectively 30 minutes, 0.02 ml. portions of the sulfite reagent are added thereto four times. The progress of the reaction is observed by thin-layer chromatography. After 2.5 hours, the reaction solution containing the sodium salt of 2-thiouridine-4-sulfonate-5'-diphosphate is mixed with 1 ml. of 0.2 M $NH_4Cl$ solution (pH 8.5) and left for 1 hour at room temperature. The mixture is then worked up, and the disodium salt of 2-thiocytidine-5'-diphosphate is thus produced.

Analogously, the poly-2 - thiocytidine - 5' - phosphate (poly s.$^2$C) is obtained from poly-2,4 - dithiouridine - 5'-phosphate (poly s.$^2$s.$^4$U).

EXAMPLE 2

A solution of 0.1 mmol of the triethylammonium salt of 4-methylthio-2-thiouridine-5'-diphosphate (UV spectrum in water, pH 5.5: $\lambda_{max.}$ 286 and 340 nm.; $A_{286}/A_{340}$=11; phosphate analysis: 1:1.95; obtainable from the triethylammonium salt of 4-methylthio-2-thiouridine-5'-phosphate analogously to Example 1) in 10 ml. of $CH_3OH$ and 1 ml. of triethylamine is saturated with $H_2S$ at room temperature and allowed to stand for 15 hours. Thereafter, the solution is evaporated to dryness, the residue dissolved in 1 ml. of $CH_3OH$, and added to 10 ml. of a 1% solution of $NaClO_4$ in acetone. The thus-precipitated disodium salt of 2,4 - dithiouridine-5'-diphosphate is removed by centrifuging and dried at 15 torr.

Analogously, the trisodium salt of 2,4-dithiouridine-5'-triphosphate is obtained from the triethylammonium salt of 4-methylthio-2-thiouridine-5'-triphosphate.

EXAMPLE 3

A solution of 0.1 mmol of the triethylammonium salt of 4-methylthio-2-thiouridine-5'-diphosphate in 10 ml. of $CH_3OH$ is saturated with $NH_3$ at room temperature and allowed to stand for 15 hours. Then, the mixture is evaporated to dryness, the residue dissolved in 0.5 ml. of $CH_3OH$, and the solution is added to 10 ml. of a 1% solution of $NaClO_4$ in acetone. The thus-precipitated disodium salt of the 2-thiocytidine-5′-diphosphate is removed by centrifuging and dried.

Analogously, the trisodium salt of 2-thiocytidine-5′-triphosphate is obtained from the triethylammonium salt of the 4-methylthio-2-thiouridine-5′-triphosphate.

EXAMPLE 4

145 mg. (0.44 mmol) of cyclohexylammonium - (2-cyanoethyl)-α-pyridyl phosphate is added to 0.2 mmol of bis(triethylammonium)-2,4-dithiouridine - 5′ - phosphate in 1 ml. of pyridine; the mixture is shaken for 3 days in darkness at 30°. Thereafter, the reaction mixture is diluted with 3 ml. of 2 N NH₄OH and concentrated to dryness by evaporation. The syrupy product is dissolved at 0° in 3 ml. of 2 N NaOH; the solution is maintained at 0° for 30 minutes, then diluted with 3 ml. of water and neutralized with an acidic ion exchanger. The ion exchanger is filtered off, thoroughly washed with water, and the aqueous solutions concentrated to a small volume. The product, 2,4-dithiouridine-5′-diphosphate, is isolated as described in Example 1(a).

By reacting 0.2 mmol of bis(triethylammonium)-2,4-dithiouridine - 5′ - phosphate with 0.8 mmol (0.3 g.) of P¹P²-(2) - cyanoethylpyrophosphoric acid imidazolidate acid imidazolidate (dicyclohexylammonium salt) in 5 ml. of DMF, amorphous trisodium salt of 2,4-dithiouridine-5′-triphosphate is analogously obtained.

EXAMPLE 5

0.5 mmol of 3′,2′-O-diacetyl - 2,4 - dithiouridine-5′-diphosphate, disodium salt, is dissolved in 50 ml. of concentrated aqueous ammonia. After 2 hours at 20°, the mixture is evaporated to dryness at 15° under reduced pressure. The residue is digested several times with anhydrous ethanol, the ethanol removed by decanting and discarded, and the ethanol-moist residue is suspended in acetone and removed by centrifuging. The thus-obtained amorphous disodium salt of 2,4-dithiouridine-5′-diphosphate is dried at 15 torr.

By using, as the starting material, the dissodium salt of N⁴-acetyl-2-thiocytidine-5′-diphosphate, the disodium salt of 2 - thiocytidine - 5′ - diphosphate is obtained in an analogous manner.

EXAMPLE 6

0.5 mmol of 3′,2′-O-ethoxymethylene-2,4-dithiouridine-5′-diphosphate, disodium salt, is dissolved in 50 ml. of 80% acetic acid. After allowing the mixture to stand for five hours at 20°, it is evaporated to dryness at 25° under reduced pressure. The residue is suspended in 50 ml. of acetone, and the amorphous dissodium salt of 2,4-dithiouridine - 5′ - diphosphate is removed by centrifuging and dried at 15 torr.

EXAMPLE 7

1 mmol of the disodium salt of 4-azido-2-thiopyrimidyl-(1′-β,D-ribose)-5′-diphosphate is dissolved in 50 ml. of 80% acetic acid; 0.5 g. of zinc dust is added thereto and the suspension is shaken for 2 hours at 20°. Thereafter, the mixture is filtered off from the zinc, and the filtrate evaporated to dryness under reduced pressure at 15°. The residue is taken up in 100 ml. of 2 N NH₄OH, and H₂S is introduced. The mixture is filtered off from the thus-precipitated ZnS, and the filtrate is gently evaporated to dryness. The disodium salt of 2-thiocytidine-5′-diphosphate is isolated as described in Example 1(a).

The preceding examples can be repeated with similar success by substituting the generically or specifically described reactants and/or operating conditions of this invention for those used in the preceding examples From the foregoing description, one skilled in the art can easily ascertain the essential characteristics of this invention, and without departing from the spirit and scope thereof, can make various changes and modifications of the invention to adapt it to various usages and conditions.

What is claimed is:
1. Thiopyrimidines of the formula

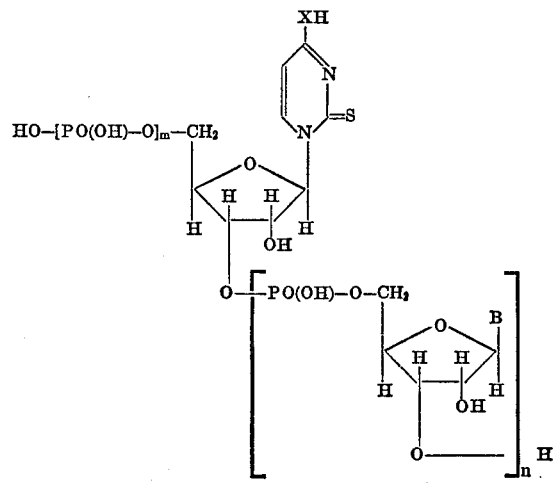

wherein B is adenyl, quanyl, cytosyl, uracilyl, thyminyl, xanthyl, hypoxanthyl, 5-fluoro-uracilyl, 5-methylcytosyl, 5-hydroxymethyl-cytosyl, 2-thiouracilyl, 4-thiouracilyl, 2-thiothyminyl, 2-thiocytosyl, 4-thiouracilyl, 2-thiothyminyl, thiothyminyl, 2-thiocytosyl, 2,4-dithiouracilyl 2,4-dithiothyminyl; X is S or NH; $m$ is an integer from 1 to 3; $n$ is an integer from 0 to 2,000 with the provision that the sum of $m+n$ is at least 2; the physiologically acceptable alkali metal, alkaline earth, heavy metal and ammonium salts thereof; and, when X is S, the corresponding disulfides.

2. A thiopyrimidine according to claim 1 wherein $m$ is 1.

3. A thiopyrimidine according to claim 1 wherein $n$ is 1.

4. A thiopyrimidine according to claim 1 wherein B is 2,4-dithiouracilyl, 2-thiocytosyl or adenylyl.

5. A thiopyrimidine according to claim 2 wherein B is 2,4-dithiouracilyl, 2-thiocytosyl or adenylyl.

6. A thiopyrimidine according to claim 5 wherein B is 2,4-dithiouracilyl and X is S.

7. A thiopyrimidine according to claim 5 wherein B is 2-thiocytosyl and X is NH.

8. A disulfide of a compound of claim 1.

9. A compound of claim 1, 2,4-dithiouridine-5′-diphosphate or an alkali metal, alkaline earth, heavy metal or ammonium salt thereof.

10. A compound of claim 1, 2,4-dithiouridine-5′-triphosphate or an alkali metal, alkaline earth, heavy metal or ammonium salt thereof.

11. A compound of claim 1, 2-thiocytidine-5′-disphosphate or an alkali metal, alkaline earth, heavy metal or ammonium salt thereof.

12. A compound of claim 1, 2-thiocytidine-5′-triphosphate or an alkali metal, alkaline earth, heavy metal or ammonium salt thereof.

13. A compound of claim 1, poly-2,4-dithiouridylic acid.

14. A compound of claim 1, poly-2-thiocytidylic acid.

15. A compound of claim 1, polyadenylyl-2,4-dithiouridylic acid.

References Cited
UNITED STATES PATENTS

| | | | |
|---|---|---|---|
| 3,440,190 | 4/1969 | Melby | 260—211.5 R |
| 3,457,253 | 7/1969 | Wechter | 260—211.5 R |
| 3,687,808 | 8/1972 | Merigan, Jr. et al. | 260—211.5 R |

JOHNNIE R. BROWN, Primary Examiner

U.S. Cl. X.R.

424—180

UNITED STATES PATENT OFFICE
CERTIFICATE OF CORRECTION

Patent No. 3,804,826                    Dated   April 16, 1974

Inventor(s)   Karl-Heinz SCHEIT, et al.

It is certified that error appears in the above-identified patent and that said Letters Patent are hereby corrected as shown below:

IN THE CLAIMS:

CLAIM 1, COLUMN 10, COMMENCING LINE 4 AFTER THE FORMULA AND ENDING ON LINE 5:

Delete "4-thiouracilyl, 2-thiothyminyl, thiothyminyl, 2-thiocytosyl"

ALSO, LINE 5:  After "2,4-dithiouracilyl", insert -- or --.

CLAIM 11, COLUMN 10, LINE 1 OF THE CLAIM:

"disphosphate" should read -- diphosphate --.

Signed and sealed this 10th day of September 1974.

(SEAL)
Attest:

McCOY M. GIBSON, JR.                    C. MARSHALL DANN
Attesting Officer                       Commissioner of Patents